Patented Apr. 3, 1951

2,547,901

UNITED STATES PATENT OFFICE 2,547,901

PROCESS FOR THE MANUFACTURE OF ALKALI METAL ALUMINUM FLUORIDE

Erling Brodal and Henning Guldhav, Hoyanger, Norway, assignors to Aktieselskapet Norsk Aluminium Company, Oslo, Norway No Drawing. Application November 15, 1945, Serial No. 628,977. In Norway May 6, 1941

2 Claims. (Cl. 23—88)

The present invention relates to the manufacture of composite fluorides suitable for use in connection with the production of aluminum metal, and has for its object a process whereby such fluorides can be produced by simple means from readily available raw-materials.

An important feature of the process consists therein that a simple fluoride is reacted upon by an alkali metal aluminate in aqueous solution. This results in the formation of an alkali metal aluminum fluoride in alkaline solution. From this solution the alkali metal aluminum fluoride can be precipitated by a more or less complete neutralization, for example by introducing carbon dioxide or a bicarbonate into the solution.

The fluoride required as an initial material for carrying out this process can be produced in any suitable manner, for example by acid or alkaline decomposition of fluorspar.

An important advantage of the process as compared with other processes for the manufacture of kryolite consists therein that it allows of the use of impure fluorspar qualities as an initial material. A fluorspar taken directly from the mine (undressed fluorspar) of the following composition: 60% $CaF_2$, 30% $SiO_2$, 8% $CaCO_3$, rest $Fe_2O_3$ and $Al_2O_3$, is thus well suited for the manufacture of the simple fluoride required to be reacted upon by alkali metal aluminate.

A suitable method for the production of the required fluoride consists according to the invention in heating fluorspar together with silica and an alkali, as for example soda, to a melting or sintering temperature. By lixiviation of the resulting reaction mass ("fluoride sinter") with water or aqueous solutions, fluoride solutions are obtained, which are directly applicable for the reaction with alkali metal aluminate.

When an aqueous solution containing alkali metal aluminate is made use of as a lixiviation agent, it is also possible by the lixiviation operation directly to obtain an alkali metal aluminum fluoride solution, from which the fluoride can be deposited by means of carbonic acid or other neutralizing agent.

Another suitable method for the production of the initial fluoride required consists according to the invention in heating calcium fluoride to a high temperature together with silica. This results in the formation of silicon fluoride, which can be converted into alkali metal fluoride by being introduced into a solution of soda or other alkali. The resulting solution can thereupon be reacted upon with a solution of an aluminate as above stated.

The silicon fluoride can also be introduced directly into an aluminate solution, whereby alkali metal aluminum fluoride in solution is formed at the same time as silica is precipitated.

When it is desired to produce a pure alkali metal aluminum fluoride, aluminate and fluoride will usually be employed in stoichiometric proportions or with a small excess of fluoride. Sometimes, however, it may be of advantage to produce the fluoride admixed with alumina. In this case an excess quantity of aluminate is employed, corresponding to the desired proportion between alumina and fluoride in the final product. In this manner products with any desired percentage of alumina or of fluoride can be manufactured. The percentage of fluoride may for example be so adjusted as to correspond to the fluorine losses in the conventional electrolytic process for the manufacture of aluminum metal. Separate supply of kryolite during the operation of the electrolytic furnace can thus be made unnecessary.

The manufacture of alkali metal aluminum fluoride according to the invention can with particular advantage be combined with the manufacture of alumina as a separate product by means of alkaline decomposition agents.

Example

A mixture of 100 kg. of fluorspar (analysis: 80% $CaF_2$, 5% $SiO_2$, 10% $CaCO_3$), 30 kg. quartz and 120 kg. calcined soda is ground and heated to sintering. The sintered mass is crushed and lixiviated in 2000 liter of water, containing 10 gr. soda per litre. Undissolved solids are filtered off, and the solution which now contains about 40 gr./l. NaF besides NaOH and $Na_2CO_3$, is mixed with an equivalent quantity of aluminate solution to form $Na_3AlF_6$. A quantity of for example 1900 litres of solution containing 40 gr./l. NaF may have been obtained, and an aluminate solution containing 13 gr./l. $Al_2O_3$ being presumed to be available. The required quantity of aluminate solution will then be 1150 litres, a slight excess of fluoride being maintained in order to prevent $Al(OH)_3$ from entering into the precipitated kryolite. When the aluminate solution has been added to the fluoride solution there will, at the prevailing concentration, be precipitated some kryolite. In order to bring about precipitation of the rest, the formed NaOH is converted into $Na_2CO_3$ by the aid of carbon dioxide gas. The precipitated kryolite is filtered off and calcined by conventional methods.

The process according to the invention, as already mentioned, is capable of being combined in various ways with the manufacture of alumina products, for the production of aluminum metal as well as for other purposes, in that the aluminate solutions obtained by alkaline decomposition of raw-materials containing alumina can be used with advantage to react with the simple fluorides.

By combining the manufacture of kryolite with the manufacture of alumina as a separate product, the required quantity of aluminate solution can be obtained to the lowest possible cost from the alumina factory. The kryolite factory on the other hand can deliver back to the alumina factory the same amount of lye free from aluminum compounds, but increased in concentration as regards alkali. The relative amounts of kryolite and alumina manufactured can be so adjusted that the amount of alkali delivered back by the kryolite factory covers the loss of alkali in the alumina factory.

The process can with particular advantage be combined with the decomposition of alumina-containing materials, such as bauxite, labradorite, nepheline and the like with limestone or lime (as described for example in the Norwegian Patent Specifications Nos. 33,535, 43,415, 44,305, 56,950 a. o.). The solutions containing alkali metal aluminate obtained by lixiviation of the resulting calcium aluminate masses can be directly employed to react with the fluorides according to the invention. And the solutions resulting after the precipitation of alkali metal aluminum fluoride can directly or after suitable preparatory treatment be utilized for the lixiviation of calcium aluminate slags. By the precipitation of the compound fluoride by means of carbonic acid or the like, the operation may then suitably be so conducted that some free NaOH is retained in the solution. Hereby a solution will result which is particularly well suited for the lixiviation of fresh quantities of calcium aluminate slags. When the required alkali metal fluoride solutions are produced by alkaline decomposition of fluorspar, it is possible to utilize soluble residuums of the fluorspar sinters in the manner that the sludge from the leaching of fluorspar sinter is after-leached with aluminate solution from the leaching of calcium aluminate slag. This sludge extraction may be carried out either together with the extraction of calcium aluminate slag or after the sludge from the aluminate extraction has been removed. The resulting clear solution can be used as described in the examples.

In the above specification the invention has been specifically described in its application on the manufacture of sodium aluminum fluoride, because this compound under the present conditions is the most important product. It will be obvious to any one skilled in the art, however, that the described process can be employed also for the manufacture of other compound fluorides of aluminum and alkali metals (comprising also ammonium).

It is also obvious that in the described process the sodium or silicon fluorides employed as reaction components can be replaced by other simple fluorides, such as for example potassium or ammonium fluoride, although such other fluorides at the present time will be of minor importance.

In the above description and in the appended claims the terms "fluorspar sinter" and "fluoride sinter" are meant to cover any fluoride reaction product, whether it has been obtained by complete or incomplete smelting or sintering of the components of the employed charge.

Likewise the expression "aluminate slag" has been used to cover sintered as well as completely melted aluminate products.

In the specification fluorspar has been mentioned as a suitable initial material. It is obvious, however, that any other fluoride material can be used and treated in substantially the same manner as above described in connection with fluorspar. Any kind of waste fluoride can also be employed.

Reference is made to our co-pending applications No. 628,976, filed November 15, 1945, and No. 644,656, filed January 31, 1946, in which variations of the method here claimed are disclosed.

We claim:

1. Process for the manufacture of alkali metal aluminium fluoride comprising the steps of heating fluorspar with alkali and silica to a temperature which is at least high enough to bring about sintering of the charge and thereupon lixiviating the resulting reaction mass in an aqueous liquid, containing some free alkali metal hydroxide, adding alkali metal aluminate in aqueous solution to the resulting solution of simple alkali metal fluoride in the presence of sufficient alkali to result in the formation of an alkaline solution of alkali metal aluminium fluoride, containing some free alkali metal hydroxide, separating suspended solids from the resulting solution and adding a neutralizing agent to the clear solution so obtained to precipitate solid alkali metal aluminium fluoride therefrom.

2. Process for the manufacture of alkali metal aluminum fluoride comprising in direct cooperative combination the steps of heating a charge, comprising fluorspar, silica and an alkaline reaction agent to obtain a solid reaction mass, containing alkali metal fluoride, lixiviating the said solid reaction mass in an aqueous liquid to obtain a solution containing alkali metal fluoride as well as some silica impurities, lixiviating a "calcium aluminate slag" in an alkaline aqueous liquid to obtain a solution of alkali metal aluminate, mixing the said solution of alkaline metal fluoride with the said solution of alkali metal aluminate to obtain an alkaline solution of alkali metal aluminum fluoride, separating suspended solids from the solution and adding a neutralizing agent to the resulting clear solution to precipitate solid alkali metal aluminum fluoride therefrom.

ERLING BRODAL.
HENNING GULDHAV.

REFERENCES CITED

The following references are of record in the file of this patent:

UNITED STATES PATENTS

| Number | Name | Date |
|---|---|---|
| 400,766 | Hall | Apr. 2, 1889 |
| 447,063 | Richter | Feb. 24, 1891 |
| 1,634,122 | Stevenson | June 28, 1927 |
| 2,196,077 | Morrow | Apr. 2, 1940 |
| 2,328,846 | Pitzer | Sept. 7, 1943 |
| 2,365,702 | Hignett | Dec. 26, 1944 |

OTHER REFERENCES

Mellor: "Comprehensive Treatise on Inorganic and Theoretical Chemistry," 1925 ed., vol. 6, pages 934, 938 and 939. Longmans, Green & Co., N. Y., publishers.